(No Model.)
H. STIER.
COKE OVEN.
No. 302,171.                     Patented July 15, 1884.
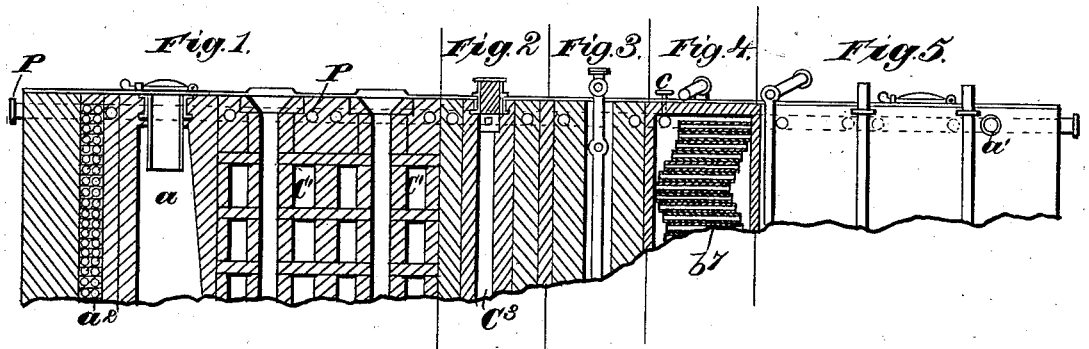
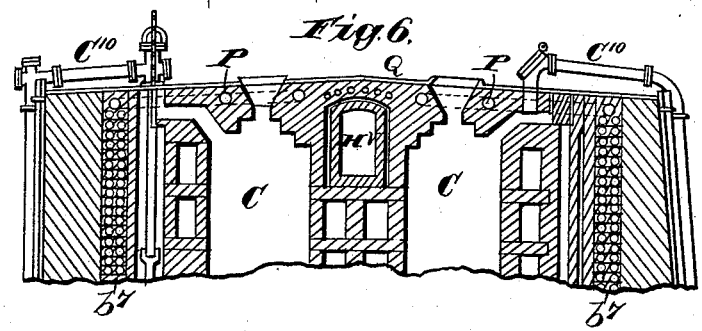
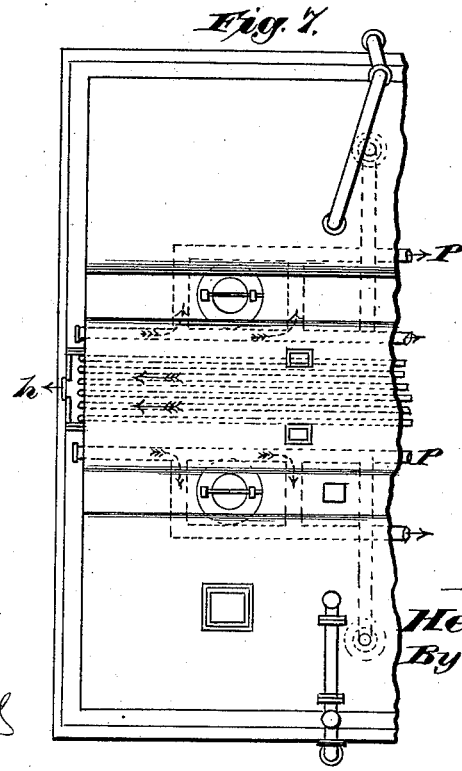
Witnesses.
Robert Everett
J. A. Rutherford
Inventor.
Heinrich Stier.
By VanSantvoord & Hauff
Attys.

UNITED STATES PATENT OFFICE.

HEINRICH STIER, OF ZWICKAU, SAXONY, GERMANY.

COKE-OVEN.

SPECIFICATION forming part of Letters Patent No. 302,171, dated July 15, 1884.

Application filed March 3, 1884. (No model.)

*To all whom it may concern:*

Be it known that I, HEINRICH STIER, a subject of the King of Saxony, residing at Zwickau, in the Kingdom of Saxony and German Empire, have invented new and useful Improvements in Coke-Ovens, of which the following is a specification, reference being had to the accompanying drawings.

This invention relates to improvements in coke-ovens of the kind described in Letters Patent of the United States No. 291,422, which were granted to me January 1, 1884.

The principal object of the invention is to secure a thorough heating of the air or gas used for combustion, and also to secure a generation of steam. For this purpose channels or pipes are arranged in the upper part of the apparatus for utilizing the radiating heat, through which channels or pipes air and water are forced, and in which they become heated, the water being turned into steam. The air may be forced in under pressure. The steam is serviceable for transformation into water-gas, which transformation can be accomplished by forcing the steam, either alone or together with air, into the coke-chamber. For this purpose the coke-chambers may be provided with a pipe or other opening leading into said coke-chamber—as, for example, the pipe $f$ shown in Fig. 6 of Patent No. 291,422. This construction of oven may thus be used for treating bituminous and carbonaceous substances for obtaining heating-gases and products of distillation.

In the accompanying drawings, Figures 1, 2, 3, and 4 are longitudinal sections, and Fig. 5 is an exterior view, of parts of a plant. Fig. 6 is a cross-section, and Fig. 7 a plan view, of parts of a plant. These figures correspond, respectively, to Figs. 1, 2, 3, 4, 5, 6, and 8 of Patent No. 291,422, the same letters indicating corresponding parts in the drawings of this application and of Patent No. 291,422.

The letter P indicates a conductor for air or gas consisting of pipes or channels. The air or gas flows or is forced through the conductor P in the direction of the arrows shown on said conductor P.

Q indicates a system of pipes or channels, which, by utilizing the heat radiating from the top or roof of the furnace, serves for the production and superheating of steam.

The heating-gases coming from the generators $a$ (or from the coke-chambers $b$, which are being operated as generators) may be mingled with the air from the pipes or channels P at any convenient point and the mixture caused to circulate through the heating-chambers $b'$, where it passes around the coke-chambers, finally passing into the main exit-channel H V for the products of combustion. The vapors and products of distillation generated in the interior of the coke-chambers pass off through the pipe or conduit $b^{10}$, as set forth in Patent No. 291,422. C, Fig. 4, is a valve or stop-cock placed in the pipe or conductor P.

Into the pipes or channels Q water or steam may be introduced from one side of the oven or furnace, which becomes vaporized and superheated by the radiating heat and flows into the accumulator $h$, from whence it may be led off for eventual use.

As regards the decomposition of the hydrocarbons and the transformation of the same into aromatic substances, the former (earth and mineral oils, residues, and the like) are led into the coke-chambers $b$, filled with incandescent coke. The tube or tubes $f$, Fig. 6, of Patent No. 291,422, may be used for such introduction into the coke-chambers. The hydrocarbons are decomposed in the coke-chambers, and are regained from the condensation, in part as fresh tar, in part as permanent gases, while the heating-chambers $b'$ are kept in operation or shut off.

Non-cokeable mineral coal, lignite, peat, bituminous slate, and other carbonaceous bodies are utilized in such manner that by bringing the same into the incandescent-coke chambers they first yield their volatile components, (tar-vapors, ammonia-water, and illuminating-gases.) After that they yield non-illuminating but combustible gases, which may serve for heating their own or other chambers, or for other purposes. When the temperature has been brought to the maximum, superheated steam may be introduced into the chamber, (the tube or tubes $f$, above named, see Fig. 6, of Patent No. 291,422, may serve for this purpose,) and water-gas generated for such a length of time as the temperature of the chamber contents (either by themselves or with the aid of the flame circulating in the heating-chambers $b'$) remains high enough.

Provided that sufficient carbon is present, heated air (or steam and air obtained, respectively, from the heaters or channels P and Q) may now (or from the beginning of the operation) be forced into the coke-chamber, and thus again heating-gas may be generated. In this manner either partial or complete exhaustion of the carbon contained in the charge by repeated alternations of the above-described manners of operation. The heating-chambers $b'$ may be kept in activity during this time to assist in the operation, or they may be closed by the slides or registers.

The heating-gases generated, because of their composition, may be advantageously used for a variety of purposes in place of furnace-cokes, charcoal, or other solid fuel. Said heating-gases may be used for preparing water gas or ammonia.

What I claim as new, and desire to secure by Letters Patent, is—

1. The combination, in an oven for the preparation of coke and for distillation, of the generator $a$, the coke-shaft $b$, and heating-chambers $b'$, with the pipes or channels P, for conducting air or gas, and independent pipes or channels Q, for water to be converted into steam, said channels being in the top wall of the oven, and adapted to deliver steam, either alone or combined with heated air, into the coke-shaft for conversion into water-gas, substantially as described.

2. The combination, in an oven for the preparation of coke and for distillation, of the generator $a$, the coke-shaft $b$, and the heating-chambers $b'$, for connecting with the shaft, with the pipes or channels P in the top wall of the furnace, for conducting air and mixing it with the gas from the generator to flow through the chambers around the coke-shafts to the main exit-channel $H^5$, and the independent pipes or channels Q in the top wall of the furnace, for conducting water or steam and connecting with an accumulator, $h$, for storing the superheated steam, said pipes or channels adapted to deliver steam, either alone or combined with heated air, into the coke-shaft for conversion into water-gas, substantially as described.

3. The combination, with a generator, $a$, and coke-shafts $b$, of pipes or channels P Q, arranged above said generator, and coke-shafts for heating air or gas and water, said pipes or channels Q connecting with an accumulator, $h$, and the channels adapted to deliver steam alone or steam and heated air combined to the coke-shafts, substantially as and for the purpose set forth.

4. The combination, with the generator $a$ and coke-shaft $b$, of channels $a^2 b^7$, arranged in front of and surrounding said generator and coke-shaft, and of channels or pipes P Q, arranged above said generator and coke-shaft, said channels P and Q being independent of each other, but capable of delivering steam alone or steam and air combined into the coke-shaft, and the steam-channels connecting with an accumulator, $h$, substantially as set forth.

5. In an oven adapted for the production of coke or distillates, the combination, with a generator, $a$, and coke-shaft $b$, of perforated walls $a^2 b^7$ and pipes or channels P Q, said pipes or channels being independently arranged in the top wall of the furnace, and the pipes adapted to deliver steam alone or steam and air combined into the coke-shaft, substantially as and for the purpose set forth.

6. The combination, with the escape-channel $H^5$, for the non-condensable products of distillation, of a heating apparatus consisting of channels P and Q above the generator and coke-shaft, said channels being arranged in the top wall of the furnace, and adapted to deliver steam alone or steam and air combined into the coke-shaft, substantially as and for the purpose set forth.

7. The combination, with the escape-channel $H^5$, for the non-condensable products of distillation, of a heating apparatus consisting of perforated walls and channels $a^2 b^7$ P Q in the surrounding or inclosing walls and above the generator and coke-shaft, for the preliminary heating of the gases, said channels P and Q being independently arranged in the top wall of the furnace, and adapted to deliver steam alone or steam and air combined into the coke-shaft, and the pipe-channels Q, connecting with an accumulator, $h$, for the storage of superheated steam, substantially as set forth.

In testimony whereof I have signed my name to this specification in the presence of two subscribing witnesses.

HEINRICH STIER. [L. S.]

Witnesses:
MARC M. ROTTEN,
ERNST SOLLIEN.